July 8, 1969  W. W. SAUNDERS  3,453,747
SINE WAVE GENERATOR
Filed July 17, 1967
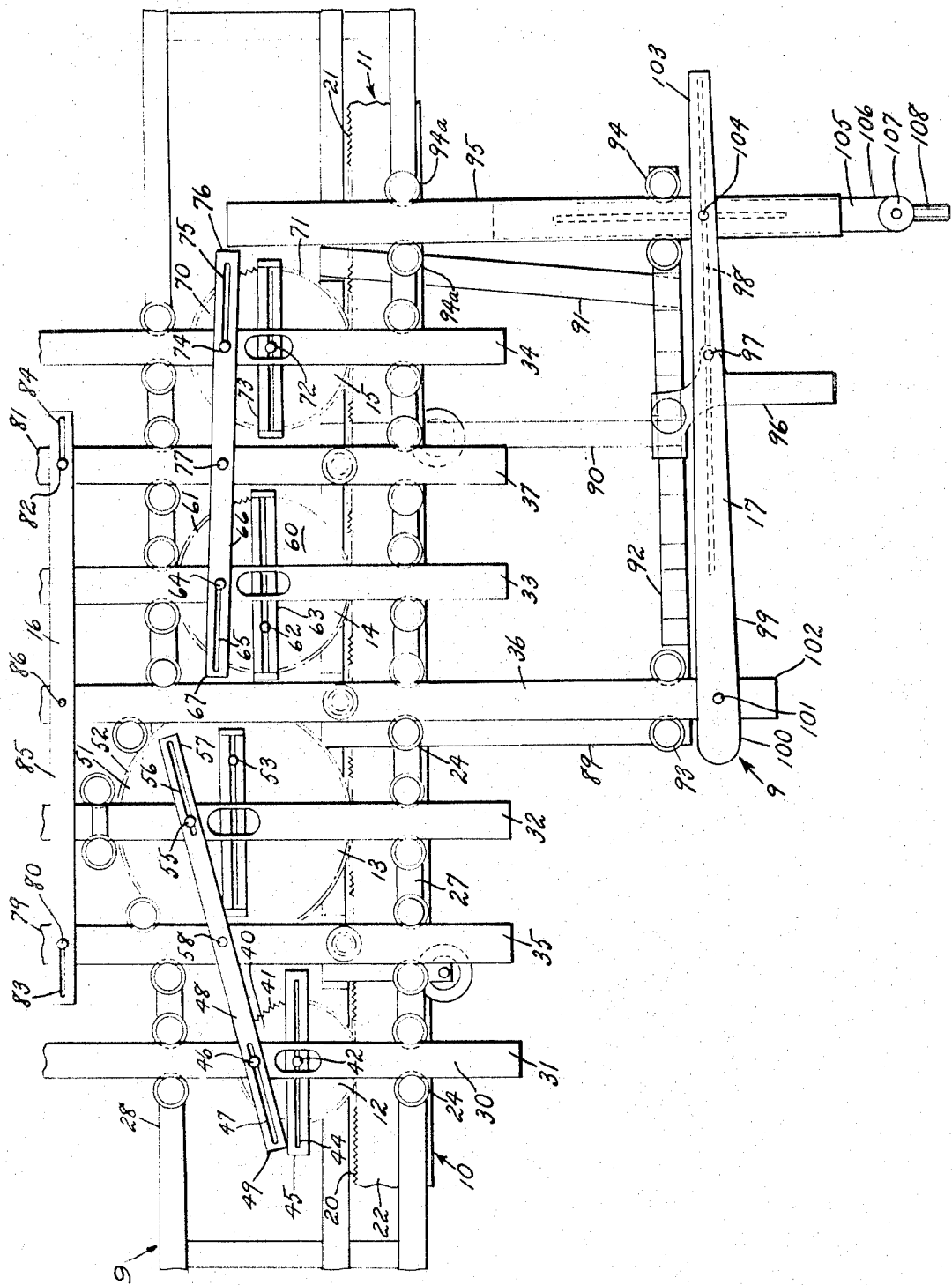

United States Patent Office 3,453,747
Patented July 8, 1969

3,453,747
SINE WAVE GENERATOR
William W. Saunders, Rockville, Md., assignor to Nanosecond Systems, Inc., Fairfield, Conn., a corporation of Connecticut
Filed July 17, 1967, Ser. No. 653,727
Int. Cl. G09b 23/04
U.S. Cl. 35—30                                        1 Claim

ABSTRACT OF THE DISCLOSURE

A mechanically operated sine wave generator for visually demonstrating the algebraic addition of two or more sine waves having similar or dissimilar periods and amplitudes as a single undulating wave form.

This invention relates generally to the field of teaching aids, and more particularly to an improved sine wave generator capable of adding, algebraically, the amplitudes and periods of two or more similar or dissimilar sine waves, to display the result thereof as a single undulating wave form.

It is among the principal objects of the present invention to provide a device of the above class which may be conveniently fabricated at reasonably low cost, to permit consequent wide sale, distribution and use.

Another object of the invention lies in the provision of an improved sine wave generator capable of performing the above described function which may be entirely mechanical in nature, and with a complete absence of electrical or electronic components.

Yet another object of the invention lies in the provision of an improved sine wave generator capable of displaying a visually observable result in the form of a scribed line upon a blackboard or other surface capable of receiving an impression.

Yet another object of the invention lies in the provision of an improved sine wave generator of the class described which may be conveniently manually adjustable by those having only ordinary skills, and in such manner the the result of an individual adjustment of a component part may be readily observed.

A feature of the disclosed embodiment lies in the fact that the same may be conveniently fabricated using metallic stamped, or synthetic resinous molded parts, which are conveniently assembled.

These objects and features, as well as other incidental ends and advantages, will more fully appear in the progress of the following disclosure, and be pointed out in the appended claim.

In the drawing, to which reference will be made in the specification, the figure is a schematic view of an embodiment of the invention.

In accordance with the invention, the device, generally indicated by reference character 9, comprises broadly: a fixed frame element 10, a moving frame element 11, first, second, third and fourth sine wave generating elements 12, 13, 14 and 15, respectively, motion coupling linkage means 16, and motion output means 17.

The fixed frame element 10 includes a horizontally supported beam of any desired length, the upper surface 20 of which is provided with a toothed rack 21. It is conveniently mounted by means (not shown) adjacent the surface of a blackboard or other display area (not shown) such that the side surface of beam 22 is free of interference.

The moving frame element 11 includes a lower horizontal beam 27 and an upper horizontal beam 28, each of which are provided with a plurality of roller guides 24 defining vertically aligned pairs of interstices 30 for maintaining yokes 31, 32, 33 and 34; and push rods 35, 36 and 37 in parallel alignment for reciprocation along vertical axes.

The first sine wave generating element 12 includes a gear member 40 having a peripheral toothed surface 41 which meshes with the rack 21 on the beam 22. The member 40 is provided with a radially adjustable pintle 42 slidably engaged within a radially arranged slot (not shown). The pintle engages the slotted opening 44 in a horizontally arranged frame 45 attached to the yoke 31. The yoke 31 mounts a pin 46 slidably arranged in a slotted opening 47 in a connecting bar 48 at the left hand end 49 thereof. From a consideration of the drawing, it will be apparent that as the gear 40 rotates accompanying side wise movement over the beam 22, the pin 42 will transmit the vertical component of its orbital motion to the frame 45, which in turn transmits motion through the yoke 31 to the pin 46 to the bar 48.

The second sine wave generating element 13 is generally similar to the first sine wave generating element 12, but preferably includes a gear member 51 of somewhat larger diameter, although, if desired, it may be of the same diameter. The gear member 51 includes a peripheral tooth surface 52 also meshing with the rack 21 on the beam 22, and a corresponding radially adjustable pintle 53 engaging the horizontally arranged frame on member 32. A pin 55 on the yoke 32 engages a slotted opening 56 in the connecting bar 48 at the rightward end 57 thereof, whereby the vertical component of the orbital motion executed by the pintle 53 is similarly transmitted.

The bar 48 mounts a substantially centrally disposed pin 58 which interconnects with the push rod 35.

The third sine wave generating element 14 is also similar to the previously described sine wave generating elements, and includes a gear member 60 having an outer periphery 61, a radially adjustable pintle 62, and a horizontally slotted member 63 on the yoke 33. The yoke 33 mounts a pin 64 engaged within a slotted opening 65 in a connecting bar 66 at the leftward end 67 thereof.

The fourth sine wave generating element 15 includes the gear member 70 having an outer periphery 71, an adjustable pintle 72 and a horizontal member 73 fixed to the yoke 34. The yoke 34 includes a pin 74 engaging a slotted opening 75 in the connecting bar 66 at the rightward end 76 thereof. The bar 66 mounts a centrally located pin 77 connected to the push rod 37.

The motion coupling linkage means 16 includes the push rods 35 and 37. The upper end 79 of the push rod 35 mounts a pin 80, while the upper end 81 of the push rod 37 mounts a pin 82. The pins 80–82 engage slots 83–84, respectively of a connecting bar 85 in a similar fashion, the bar 85 mounting a pin 86 which connects to the push rod 36.

The motion output means 17 includes fixed vertical support members 89, 90 and 91 supporting a fixed horizontal member 92 having roller guides 93 engaging the push rod 36 and roller guides 94 which in conjunction with roller guides 94a support a stylus aligning member 95 in vertical orientation. A handle member 96 secured to the member 92 mounts a pintle 97 disposed in a slotted guide 98 in a horizontal link member 99, the leftward end 100 of which interconnects with the push rod 36 through pintle means 101 at the lower end 102 thereof. The rightward end 103 of the guide 98 engages a pintle 104 on a stylus support 105 which rides within the aligning member 95, the lower end 106 thereof being provided with thumb screw means 107 for retaining a chalk stick or stylus 108.

The operation of the device will be apparent from the above description. Depending upon whether a longer or shorter period is desired for an individual sine wave to be generated, one of the four wave generating elements 12–15 is selected, and a desired amplitude is determined by adusting the corresponding radially adjustable pin. A second wave is predetermined in a similar manner, and any sine wave generating elements not used are rendered in effective by locating the corresponding radially adjustable pin at the center of the corresponding gear member, as for example as shown in the drawing in the case of the first and fourth sine wave generating elements 12 and 15, respectively.

By manually grasping the handle member 96, and moving the frame element 11 leftwardly or rightwardly as seen in the drawing, the vertical components of motion of each of the pins in use will be transmitted through the above described linkage to result in vertically reciprocating motion of the chalk or stylus 108. With the horizontal movement of the frame element, rotation is imparted to the members 41, 51, 61 and 71 by virtue of their engagement with the rack 20. This motion is transmitted to result in vertical motion of members 31, 32, 33 and 34 to a degree determined by the displacement of the pins 42, 53, 62 and 72 from the center of members 41, 51, 61 and 71, respectively. Motion of members 31 and 32 is transmitted through pins 46 and 55 to pin 58. Movement of member 35 which represents the addition of movements of members 31 and 32 is transferred through pintle 80 to member 85. In a similar manner, movement of pins 62 and 72 is transferred through members 33 and 34, pins 64 and 74, member 66 and pin 77 to member 37, and thence through pin 82 to member 85. The movement of member 85 is transferred through pin 86 to member 102, pin 101, member 100 and pin 104 to result in pivotal motion of member 99 about pin 97. Motion of pin 104 is transferred to member 95, and thence to chalk 108. Where a pure sine wave is desired, only one of the sine wave generating elements is used, the selection depending upon the desired amplitude and period. Two, three or four individual waves of varying amplitude may be added as desired, and the result of the algebraic addition will be described by the motion output means in each case.

I wish it to be understood that I do not consider the invention limited to the precise details of structure shown and set forth in this specification, for obvious modifications will occur to those skilled in the art to which the invention pertains.

I claim:

1. Wave generating means for describing a single resultant wave which is the additive results of a plurality of sinewaves of lesser periods and amplitudes comprising: a relatively fixed frame element, a relatively movable frame element, a plurality of sinewave generating elements mounted upon said movable frame element, and operated by movement of said movable frame element with respect to said fixed frame element, linkage means for adding the algebraic sum of the amplitudes of each of said sinewave generating elements, and motion output means connected to said linkage means; said sinewave generating elements each including a gear member meshing with a common rack on said fixed frame element, said gear member having a radially adjustable pin, and yoke means connected to said pin to transmit a component of motion thereof in a direction perpendicular to the access of said rack.

References Cited
UNITED STATES PATENTS 1,201,513   10/1916   Severy _____ 33—18

LAWRENCE CHARLES, *Primary Examiner.*

U.S. Cl. X.R.

33—27